United States Patent
Scholz

(10) Patent No.: US 8,136,290 B2
(45) Date of Patent: Mar. 20, 2012

(54) ROTATIONAL BLUE LIGHT BEAM DEER FLY ELIMINATOR

(76) Inventor: Raymond Scholz, Gloucester, VA (US)

( * ) Notice: Subject to any disclaimer, the term of this patent is extended or adjusted under 35 U.S.C. 154(b) by 281 days.

(21) Appl. No.: 12/207,971

(22) Filed: Sep. 10, 2008

(65) Prior Publication Data
US 2010/0058646 A1 Mar. 11, 2010

(51) Int. Cl.
*A01M 1/04* (2006.01)
*A01M 1/22* (2006.01)

(52) U.S. Cl. ............................................. 43/113; 43/112

(58) Field of Classification Search ...................... 43/113, 43/112
See application file for complete search history.

(56) References Cited

U.S. PATENT DOCUMENTS

| | | | | |
|---|---|---|---|---|
| 959,155 A * | 5/1910 | Nault | | 43/113 |
| 981,459 A * | 1/1911 | Moncus | | 43/111 |
| 1,029,972 A * | 6/1912 | Britton | | 43/139 |
| 1,036,331 A * | 8/1912 | Plumer | | 43/139 |
| 1,071,620 A * | 8/1913 | Kingsland | | 43/139 |
| 1,302,972 A * | 5/1919 | Rea | | 43/139 |
| 2,384,930 A * | 9/1945 | Kendrick | | 43/113 |
| 2,737,753 A * | 3/1956 | Bittner | | 43/113 |
| 2,799,117 A * | 7/1957 | Stokes et al. | | 43/113 |
| 2,873,551 A * | 2/1959 | Misko | | 43/111 |
| 3,321,862 A * | 5/1967 | Peek | | 43/113 |
| 4,251,945 A * | 2/1981 | Tasma | | 43/113 |
| 4,282,673 A * | 8/1981 | Focks et al. | | 43/113 |
| 4,314,421 A * | 2/1982 | Cheong | | 43/111 |
| 4,356,656 A * | 11/1982 | Tasma | | 43/113 |
| 4,438,585 A * | 3/1984 | Slatton | | 43/113 |
| 4,519,160 A * | 5/1985 | McBrayer | | 43/113 |
| 4,856,226 A * | 8/1989 | Taylor | | 43/113 |
| 4,944,114 A * | 7/1990 | Burton et al. | | 43/113 |
| 5,003,721 A * | 4/1991 | Underwood | | 43/132.1 |
| 5,209,010 A * | 5/1993 | Vickery | | 43/139 |
| 5,417,009 A * | 5/1995 | Butler et al. | | 43/113 |
| 5,501,034 A * | 3/1996 | Hazan | | 43/132.1 |
| 6,282,833 B1 * | 9/2001 | Dashefsky | | 43/132.1 |
| 7,363,745 B2 * | 4/2008 | Hsin-Chang et al. | | 43/113 |
| 7,607,255 B2 * | 10/2009 | Hu | | 43/113 |
| 2006/0218851 A1 * | 10/2006 | Weiss et al. | | 43/113 |
| 2007/0039234 A1 * | 2/2007 | Reime | | 43/113 |
| 2007/0107298 A1 * | 5/2007 | Miao et al. | | 43/113 |
| 2007/0175085 A1 * | 8/2007 | Chen | | 43/113 |
| 2009/0277074 A1 * | 11/2009 | Noronha | | 43/113 |
| 2010/0058645 A1 * | 3/2010 | Reime | | 43/113 |
| 2010/0071254 A1 * | 3/2010 | Calkins et al. | | 43/113 |

FOREIGN PATENT DOCUMENTS

| | | | |
|---|---|---|---|
| EP | 87250 A1 * | 8/1983 | |
| GB | 2380387 A * | 4/2003 | |
| JP | 02013340 A * | 1/1990 | |
| JP | 11075657 A * | 3/1999 | |
| JP | 2000253793 A * | 9/2000 | |
| JP | 2002125563 A * | 5/2002 | |

(Continued)

*Primary Examiner* — Darren W Ark
(74) *Attorney, Agent, or Firm* — Byers Law Group; Duncan G. Byers

(57) ABSTRACT

A motor-driven tubular hollow cylindrical partial mask component surrounds a central vertical blue light and rotates around the blue light. The hollow cylindrical partial mask blacks out a major portion of the blue light. A single vertical transparent slit in the partial mask admits blue light out to form a 360 degree scanning vertical beam of blue light as the partial mask rotates to attract deer flies, bell hornets and other flying insects. The flying insects enter through a surrounding exterior electrified cage to be electrically zapped and exterminated.

4 Claims, 3 Drawing Sheets

FOREIGN PATENT DOCUMENTS

| | | | | |
|---|---|---|---|---|
| JP | 2003180219 | A | * | 7/2003 |
| JP | 2003199471 | A | * | 7/2003 |
| JP | 2005341921 | A | * | 12/2005 |
| JP | 2006223204 | A | * | 8/2006 |
| WO | WO 9217060 | A1 | * | 10/1992 |
| WO | WO 9403053 | A1 | * | 2/1994 |
| WO | WO 2007045879 | A1 | * | 4/2007 |

* cited by examiner

ROTATIONAL BLUE LIGHT BEAM DEER FLY ELIMINATOR

CROSS-REFERENCE TO RELATED APPLICATIONS

The present utility patent application claims the benefit of provisional application No. 60/954,461 filed Aug. 7, 2007.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to outdoor insect eliminators and in particular to a blue light with a rotating partial mask constantly rotating around the blue light to produce a rotating beam of blue light from inside of an electrified cage to attract and kill deer flies, bell hornets and other insects drawn to the rotating beam of blue light bug zapper, but not attracted to the traditional stationary bright light.

2. Description of Related Art Including Information Disclosed Under 37 CFR 1.97 and 1.98

Many outdoor-loving consumers enjoy spending time on a patio or open porch. For some, bugs and flies can overrun this relaxing family time or impromptu social event. Quite often, the blue light of a bug zapper can be seen, although this standard type of bug killer does nothing to deter deer flies from an area. These flies are resistant to various forms of bug sprays as well, making them difficult to eliminate. Without an adequate form of protection against such vicious flies, outdoor gatherings can be ruined.

Prior art devices fail to address the unique problems in eliminating these types of pests.

What is needed is a rotating mask with a limited viewing opening encircling a blue light centrally positioned within an insect electrifying cage to provide a periodically flashing blue light bug-zapping device that will rid an area of deer flies, bell hornets and other insects drawn to a periodically flashing blue light bug zapper, but not attracted to the traditional stationary bright light.

BRIEF SUMMARY OF THE INVENTION

An object of the present invention is to provide a rotating mask with a limited viewing opening encircling a blue light centrally positioned within an insect electrifying cage to provide a periodically flashing blue light bug-zapping device that will rid an area of deer flies, bell hornets and other insects drawn to the 360 degree scanning blue light in the bug zapper of the present invention, but not attracted to a traditional stationary bright light.

In brief, the present invention will effectively eliminate deer flies from any area in which this item is used. A motor-driven tubular hollow cylindrical mask component surrounds a central vertical blue light and rotates around the blue light. The hollow cylindrical mask blacks out approximately 225- degrees around the blue light leaving a rotating vertical beam of blue light shining out through a vertical mask opening approximately 135 degrees wide. In this manner, the rotating vertical beam of blue light, similar to a lighthouse beacon, attracts deer flies that are normally not attracted to a brightly shining and fully visible blue light. These types of flies will enter through the surrounding exterior electrified screen to be electrically zapped and exterminated. The motor is positioned on the bottom of the unit and is powered by electricity. The motor-driven component can be made of any durable and weatherproof black material suitable for use near this type of light. The present invention preferably measures approximately 24" high, 8" long, and 8" wide and is ready to hang in any outdoor location.

The present invention is a uniquely structured, outdoor, bug zapping product that will eradicate the deer flies and bell hornets that are not otherwise attracted to a standard bug-zapping unit. The present device offers an improved method for ridding an outdoor area of deer flies and bell hornets as it features a rotating component that will catch the eye of these insects. Attracted to movement, the flies and hornets will venture toward the periodically appearing light expecting a meal, only to be "zapped" on contact with the outer electrified screen. The painful bites of these annoying flies will no longer be felt with the addition of the present invention to any outdoor porch or patio area.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings.

DETAILED DESCRIPTION OF THE INVENTION

In FIGS. 1-4, an outdoor flying insect trap device 10 for attracting and exterminating flying insects comprises a vertical central blue light 50 surrounded by a motor-driven vertical rotating hollow cylindrical partial mask 40 emitting a rotating beam of blue light from inside an electrified wire insect exterminating cage 30. The rotating beam of blue light attracts flying insects which are exterminated by the exterminating cage 30.

Figure 1:
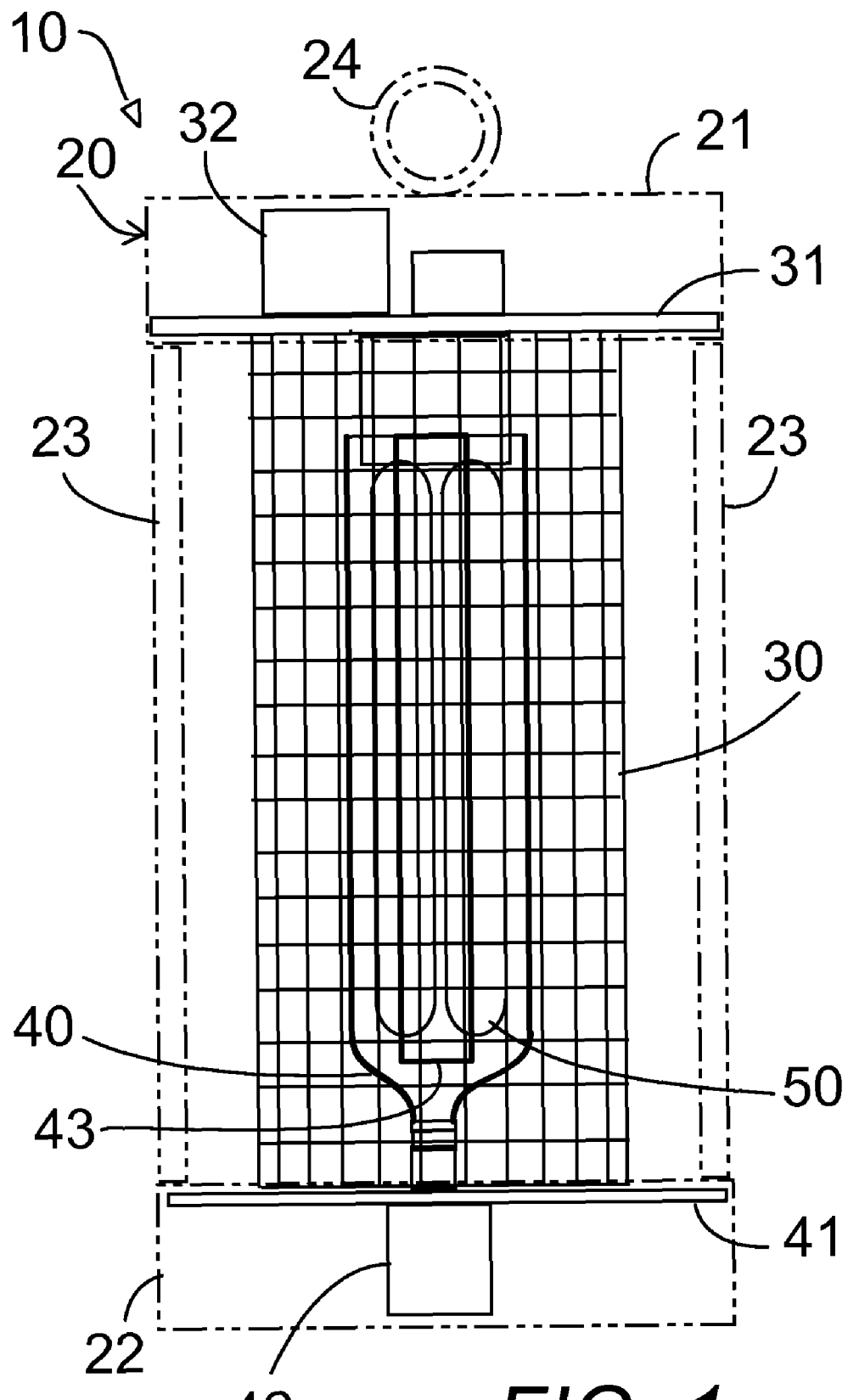
FIG. 1 is a side elevational view of the assembled components of the rotational blue light flying bug exterminator of the present invention.
Figure 2:
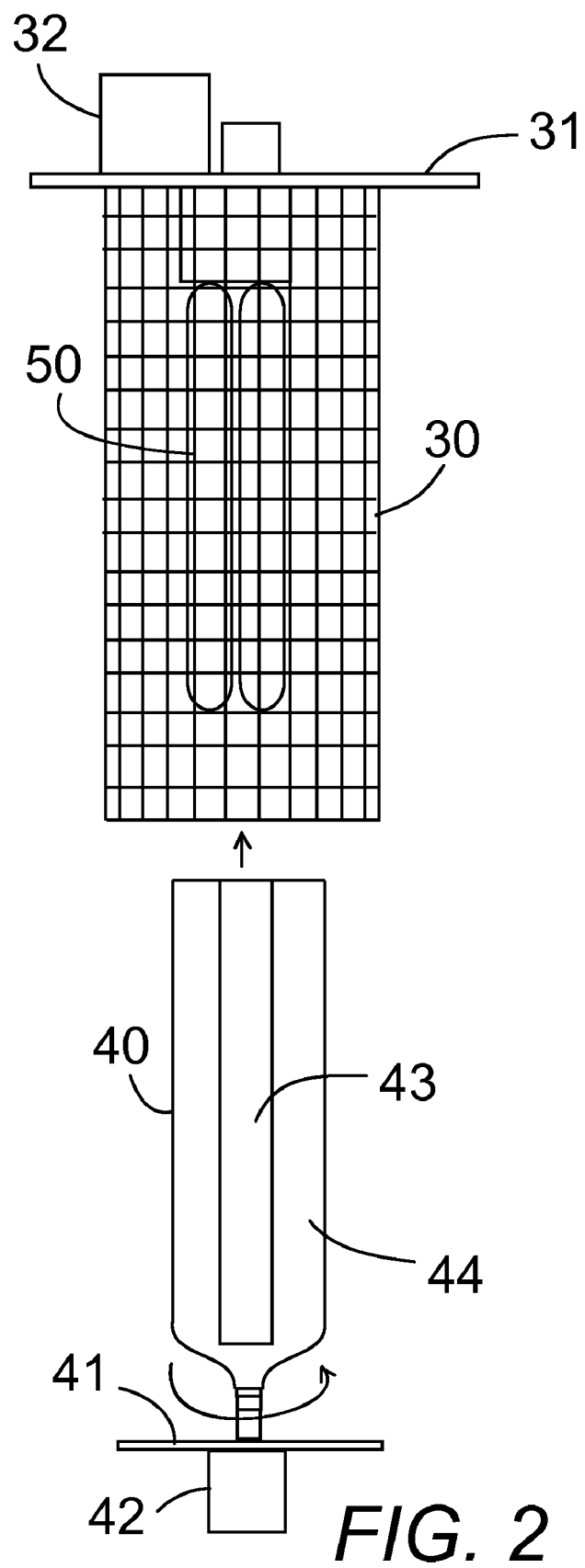
FIG. 2 is an exploded side elevational view of the interior components of the rotational blue light flying bug exterminator of FIG. 1 aligned for assembly.

In FIG. 2, the blue light 50 hangs down from an upper plate 31 in a top housing 21 which is part of the outer support structure 20. The upper plate also supports the insect exterminating cage 30 hanging down from the upper plate 31. The cage 30 is electrified by a grid transformer 32 mounted on the upper plate 31.

The partial mask 40 extends upwardly from a bottom plate 41 in a lower housing 22 which is part of the outer support structure 20. An electric motor 42 in the lower housing 22 turns the partial mask 40 in a circular motion. The partial mask 40 is preferentially a waterproof cylinder that is transparent to the blue light 50, and wherein the mask portion 44 is a coating applied to a portion of the exterior of the cylinder such that the blue light 50 is blocked from shining through the mask portion 44, but the blue light 50 shines through a vertical transparent portion 43 to which the coating has not been applied. The vertical transparent portion 43 is preferably a single vertical uncoated portion of the cylinder. It will be understood that the partial mask 40 may also comprise a cylinder of material that is opaque to the blue light 50, but wherein a vertical slit 43 is physically cut or removed from the partial mask 40 so that blue light 50 may still emanate from within the partial mask 40 and be visible outside of the partial mask 40. The partial mask 40 is rotated about its vertical axis by the electric motor 42, and as the hollow cylindrical partial mask 40 continually rotates around the blue light 50, a vertical beam of blue light shines out through the vertical transport portion 43 to form a three hundred sixty degree scanning beam 51 of blue light, as shown in FIG. 4, to attract flying insects especially deer flies, bell hornets and other flying insects drawn to the 360 degree scanning blue light in the bug zapper of the present invention, but not attracted to a traditional stationary blue light.

Figure 3:
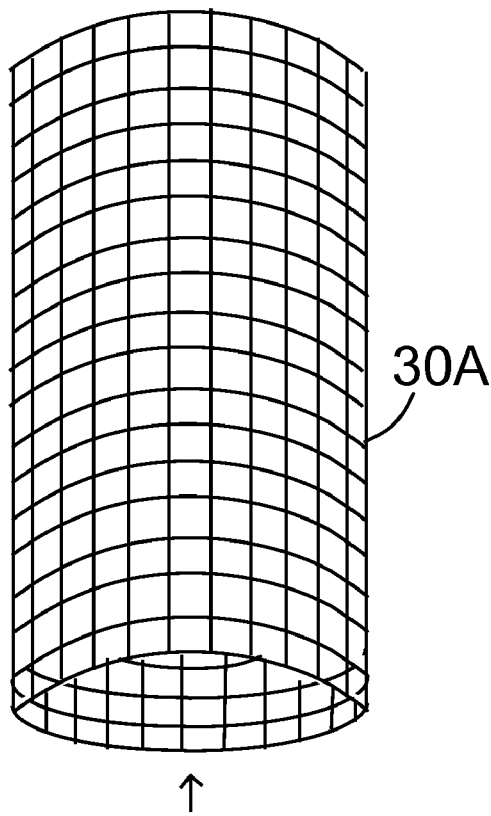
FIG. 3 is an exploded perspective view of the two nesting electrified wire exterminating cages of the present invention aligned for assembly.
Figure 3:
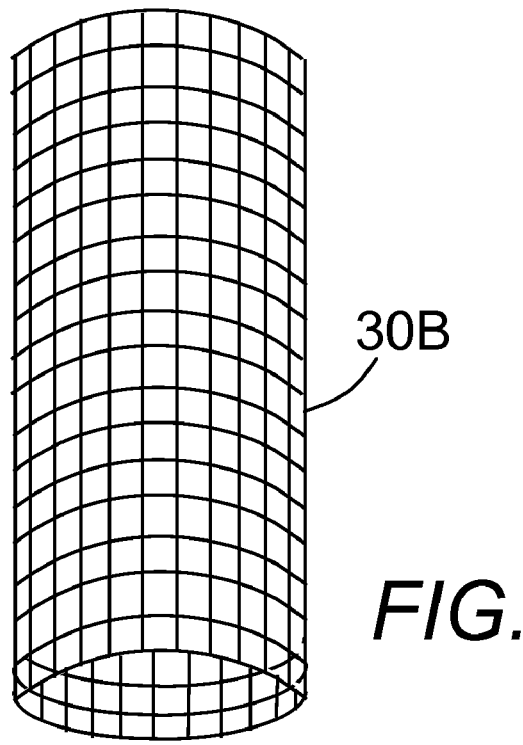
Figure 4:
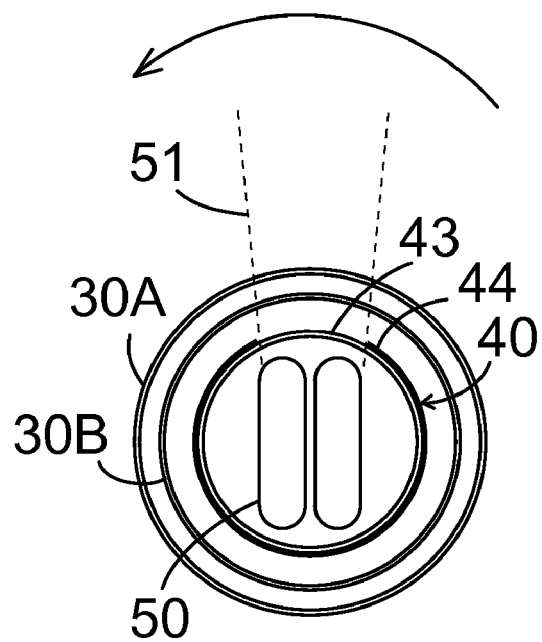
FIG. 4 is a plan view of the assembled blue light, rotating partial mask, and spaced nesting electrified wire exterminating cages of the present invention showing the scanning blue beam of light.

The insect exterminating cage 30 is preferably a double spaced nested structure formed by two cylindrical electrically conducting wire mesh cages 30A and 30B with sufficient openings in the wire structure to admit deer flies and bell hornets and other flying insects therethrough, The insect exterminating cage 30 surrounds the blue light 50 and rotating partial mask 40 and the insect exterminating cage 30 is charged by an electric current from the grid transformer 32 so that when a flying insect attempts to fly through the insect exterminating cage 30 to get to the blue light 50, the flying insect is killed by an electric charge through the insect in passing between the two cylindrical electrically conducting wire mesh cages 30A and 30B of the insect exterminating cage 30, shown in FIGS. 3 and 4.

A top loop 24 attached to the top housing 21 of the support structure 20 provides a means for hanging the outdoor flying insect trap device to an external structure for elevating the device.

In use, the outdoor flying insect trap device 10 is hung in an outdoor setting from a tree, pole, portion of a building, trellis, or any external structure and the device plugged into an electric outlet and turned on so that the blue light 50 is turned on, the partial mask 40 rotates and the insect exterminated cage 30 electrified to rid the outdoor space of unwanted flying insects.

It is understood that the preceding description is given merely by way of illustration and not in limitation of the invention and that various modifications may be made thereto without departing from the spirit of the invention as claimed.

What is claimed is:

1. An outdoor flying insect trap device for attracting and exterminating flying insects, the device comprising:
    a blue light for attracting flying insects;
    a rotating partial mask surrounding the blue light, the partial mask comprising a light-proof hollow cylinder positioned vertically so that the hollow cylinder surrounds the blue light, the hollow cylinder having at least one opening through a portion of the wall of the cylinder to admit light from the blue light through the at least one opening, the hollow cylinder being continually rotated around the blue light by a motor communicating with the hollow cylinder so that a beam of blue light shines out through the at least one opening to form a three hundred sixty degree scanning beam of blue light through the at least one opening as the hollow cylinder rotates around the blue light;
    an insect exterminating cage surrounding the blue light and rotating partial mask, the insect exterminating cage charged by an electric current so that when a flying insect attempts to fly through the insect exterminating cage to get to the blue light, the flying insect is killed by the electric current in the insect exterminating cage, thereby forming an outdoor flying insect trap device for attracting and exterminating flying insects.

2. The device of claim 1 further comprising means for hanging the outdoor flying insect device to an external structure for elevating the device.

3. The device of claim 1 wherein the at least one opening comprises a single vertical slit opening to admit the blue light out of the vertical slit opening.

4. The device of claim 1 wherein the motor communicating with the hollow cylinder comprises an electric motor positioned below the hollow cylinder to rotate the hollow cylinder around the blue light.

* * * * *